United States Patent
Cowans

(10) Patent No.: US 6,626,649 B2
(45) Date of Patent: Sep. 30, 2003

(54) PUMP SYSTEM EMPLOYING LIQUID FILLED ROTOR

(75) Inventor: Kenneth Wesley Cowans, Fullerton, CA (US)

(73) Assignee: Advanced Thermal Sciences Corp., Anaheim, CA (US)

( * ) Notice: Subject to any disclaimer, the term of this patent is extended or adjusted under 35 U.S.C. 154(b) by 230 days.

(21) Appl. No.: 09/906,624

(22) Filed: Jul. 18, 2001

(65) Prior Publication Data

US 2003/0017062 A1 Jan. 23, 2003

(51) Int. Cl.[7] .................................................. F04B 39/02
(52) U.S. Cl. ....................................................... 417/366
(58) Field of Search ................................ 417/366, 357, 417/423.14, 373, 423.12, 423.15

(56) References Cited

U.S. PATENT DOCUMENTS

| 3,192,861 | A | | 7/1965 | Haegh | |
|---|---|---|---|---|---|
| 4,160,629 | A | * | 7/1979 | Hidden et al. | 418/55.3 |
| 5,403,154 | A | | 4/1995 | Ide | |
| 5,522,709 | A | | 6/1996 | Rhoades | |
| 5,525,039 | A | | 6/1996 | Sieghartner | |
| 5,833,437 | A | * | 11/1998 | Kurth et al. | 417/36 |
| 5,882,182 | A | * | 3/1999 | Kato et al. | 417/366 |
| 6,068,455 | A | | 5/2000 | Cowans | |
| 6,082,495 | A | * | 7/2000 | Steinbarger et al. | 184/99 |
| 6,098,422 | A | * | 8/2000 | Tischer | 62/505 |
| 6,329,731 | B1 | * | 12/2001 | Arbanas et al. | 310/52 |
| 6,409,480 | B1 | * | 6/2002 | Dieno et al. | 417/321 |
| 6,499,971 | B2 | * | 12/2002 | Narney et al. | 417/410.3 |

* cited by examiner

Primary Examiner—Teresa Walberg
Assistant Examiner—Vinod D. Patel
(74) Attorney, Agent, or Firm—Jones, Tullar & Cooper PC

(57) ABSTRACT

A long life rotor pump combination of the type having a liquid filled rotor that uses the liquid being pumped to establish hydrodynamic bearings within the rotor incorporates a pump which can be expanded to include more than one impeller, providing an optionally higher flow rate. Thermal isolation between the motor housing and the pump housing is assured by restricting heat conductivity through the physical structures and through the liquid. The rotor enclosure is formed with a number of engaging but not joined elements maintained under compression established by forces exerted in securing the encompassing motor housing.

29 Claims, 9 Drawing Sheets

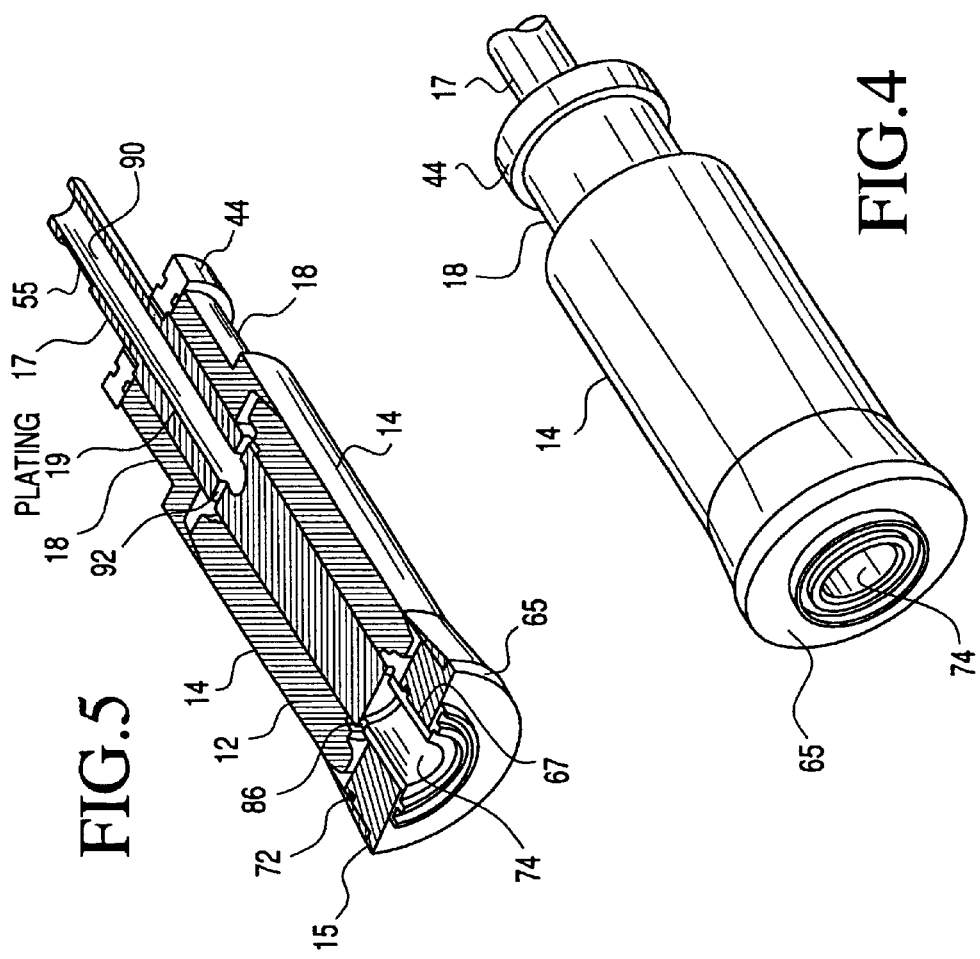
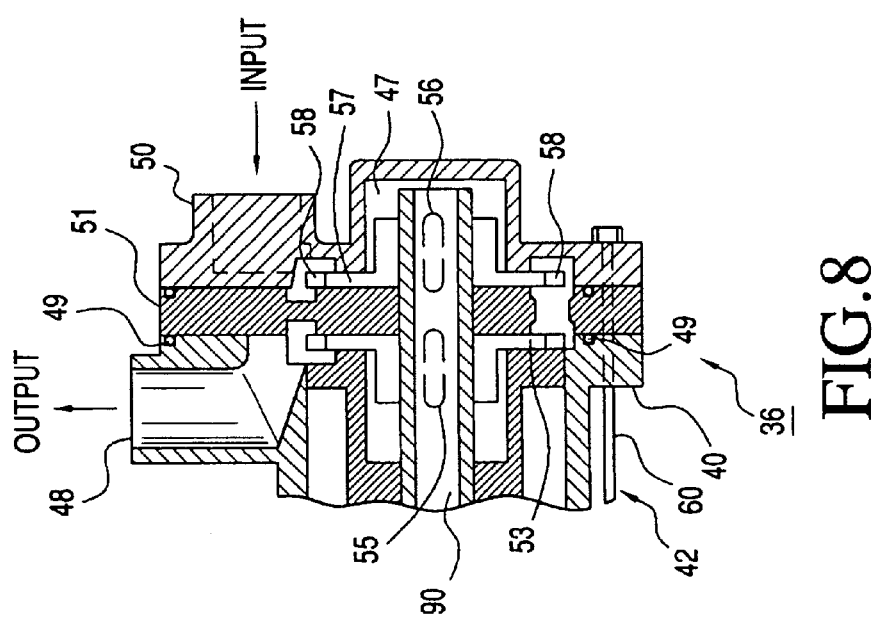

PUMP SYSTEM EMPLOYING LIQUID FILLED ROTOR

FIELD OF THE INVENTION

This invention relates to long life motor driven pump systems, and particularly pump systems of the type that employ the same liquid that is being pumped as lubricant within the motor housing, even though the liquid in the pump can vary widely in temperature and viscosity.

BACKGROUND OF THE INVENTION

Motor driven pump systems in which the rotor is enclosed within a liquid filled shell are known and are used in a number of applications. A significant advance in such systems has been provided by the teachings of U.S. Pat. No. 6,068,455, to Kenneth W. Cowans, issued May 30, 2000 and entitled "Long Life Pump System". This type of pump system is particularly needed where the properties of the liquid being pumped may change substantially with time because of temperature and viscosity differences, as can occur in a temperature control system for semiconductor fabricating tools. Such systems must reliably operate over exceptionally long life spans in order that the expensive fabricating tools with which they are used need not be shut down periodically for pump or motor servicing. The system of the '455 patent teaches how the same thermal transfer fluid that is being pumped can be within the interior of the closed rotor housing, and lubricate hydrodynamic bearings in an essentially athermal manner, regardless of the temperature and viscosity variations of the same fluid at the pump. The rotor interior is isolated from thermal variations in the pump to a sufficient degree by restricting interflow, and by limited heat conduction and convection paths.

Manufacturing costs and assembly techniques, however, are always of importance in units of this kind, particularly where volume production rates are required. Thus it can be very useful for the pump/rotor system to be so designed as to be externally fillable and made of interchangeable parts that can be readily assembled, but at the same time remain leak free for long periods when in service. Finding other means of cost reduction, as by simplification and standardization of parts, are other paramount objectives. Further, it is desirable to have greater versatility in system operation, such as the ability to vary the pump rate with minimal changes of components. In addition the unit should be compact and operate stably with minimal wear of the moving parts during its service life. These and other objectives are achieved, in accordance with the invention, by the novel configuration disclosed herein.

SUMMARY OF THE INVENTION

A regenerative turbine-type pump operated by an adjacent motor having a fluid-filled enclosed rotor disposes the rotor within a nonmagnetic cylindrical shell completed at each end by closure members which can provide bearing surfaces for a central shaft. One end of the shaft extends into the interior of the pump housing, to provide a rotatable mount for at least one impeller. The pump housing is secured to a motor housing, which itself encompasses the stator provided about the cylindrical shell. Thermal conductivity between the pump and motor is low because the units are designed to have minimal areal contact between abutting metal parts of relatively low conductivity. Alternatively, a low thermal conductivity element concentric with the shaft can be interposed between the two housings. The end structure for one end of the cylindrical shell comprises an end hub having a central bore open to the interior of the rotor shell, the end hub being maintained in position by a removable end cap for the motor housing. An interposed concentric compression spring about the central bore holds the end hub tightly against the end hub when the housing end cap is tightened in place, even though the end hub is not physically joined to the shell. The central bore in the end hub is closed by a closure member for the rotor shell which seats a fill valve for the thermal transfer fluid. Short central bores in the shaft from each end, with radial outlets into the rotor interior enable thermal transfer fluid to flow into the inner side of the bearings at each end of the rotor. After filling, the fluid volume within the rotor and about the hydrodynamic bearings stabilizes in temperature and is not destabilized in by immaterial amounts of fluid movement.

This arrangement provides a simplified shell construction about the rotor that is effectively sealed against leakage for long use periods. Nonetheless, it can be assembled and disassembled with replacement parts, because the concentric compression spring compensates for tolerance variations between parts. The spring, such as a Belleville spring, exerts a selected substantial compressive force along the central axis to maintain the rotor enclosure sealed after assembly. The end supports adjoining or coupled to the rotor shell usefully form journals for the shaft ends when surfaced with a noble metal, such as silver. Alternatively, integral hydrodynamic bearings for long life operation can be supported by sleeves inserted within the rotor shell as journals for bearings at each end of the shaft, and to account for size differences between the end supports and the rotor shaft.

Another useful aspect of the invention derives from limited heat conductive paths existing between the pump housing and the rotor enclosure provided by spaced apart legs on the pump housing engaging the motor housing and an inner ring engaging the rotor shell or an intervening isolator. Other alternative features of the construction include the inclusion of an integral rotor shell and end sleeve on the pump side, and a single end closure member on the fill side, reducing both the number of parts employed and the cost.

In accordance with another feature of the invention, the pump housing may be configured to receive an extended end on the rotor shaft, which end includes two axially spaced apart mounting surfaces for attachment of one or, alternatively, two impellers. Also, the impeller housing is configured with a base on the rotor side and an opposed end cap which can either be directly coupled to the base or to an interposed spacer element which mates between the base and end cap. When the insert and second impeller are included in the pump housing the flow paths for the thermal transfer fluid are still maintained in continuity between the inlet and outlet.

BRIEF DESCRIPTION OF THE DRAWINGS

A better understanding of the invention may be had by reference to the following description, taken in conjunction with the accompanying drawings, in which:

FIG. 4 is a perspective view of a rotor enclosure that may be employed in the system;

FIG. 5 is a broken away perspective view of details of the rotor enclosure of FIG. 4;

FIG. 8 is a side sectional view of a modification of the pump end of the motor/pump assembly showing how one or two impellers may be alternatively employed;

DETAILED DESCRIPTION OF THE INVENTION

Figure 1:
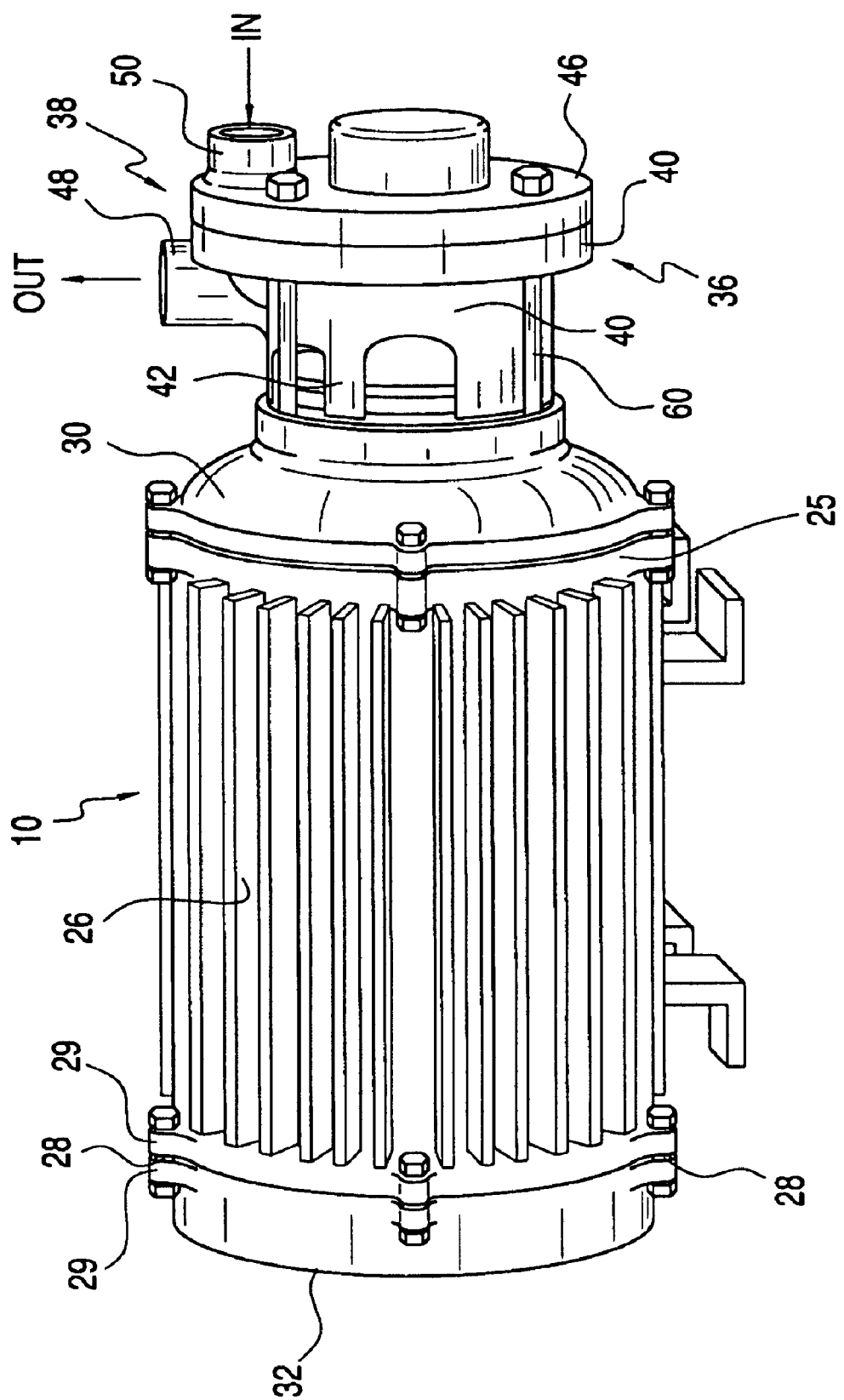
FIG. 1 is a perspective view of a motor/pump combination in accordance with the invention

With reference now to FIGS. 1 to 7, a motor/pump combination in accordance with the invention includes a motor 10 of the type having an enclosed rotor 12 within a cylindrical rotor shell 14 having a length of thin-walled nonmagnetic material as its central section. The shell 14 includes, at what may be called the fill end, an opening formed by an edge 15 concentric with the central axis of the rotor 12. A motor shaft 17 along the central axis extends in opposite directions from the rotor 12 to a first end at the pump side, and through the open end edge 15 of the shell 14 at its second or fill end. An extension of the cylindrical shell 14 on the first end comprises an end hub 18 forming a journal 19 (FIGS. 5 and 8) closely fitting about the shaft 17. The journal 19 surface is plated with a noble metal, such as silver, to provide a suitably smooth, low friction surface in opposition to bearing surface on the shaft 17, to maintain a hydrodynamic bearing effect upon rotation at a sufficient rate with the bearing gap being occupied by thermal transfer fluid.

Immediately about the outside of the thin walled length portion of the cylindrical shell 14 is a conventional stator 23 which in turn is encompassed by the exterior motor housing 25, the central region of which has protruding lengthwise fins 26 aiding in dissipation of heat generated in consumption of electrical energy. Short longitudinal bolts 28 which pass through lugs 27 on the housing parts are engaged at each end by nuts 29 which secure the motor housing 25 to a first end cap 30 at the pump end, and to a second end cap 32 at the fill end. The second end cap 32 at the fill end includes a central bore 33 coextensive with and about the shaft 17, and the wall of the body of the housing 25 includes an inner circumferential periphery 34 and an outer circumferential periphery 35 in this region.

Figure 2:
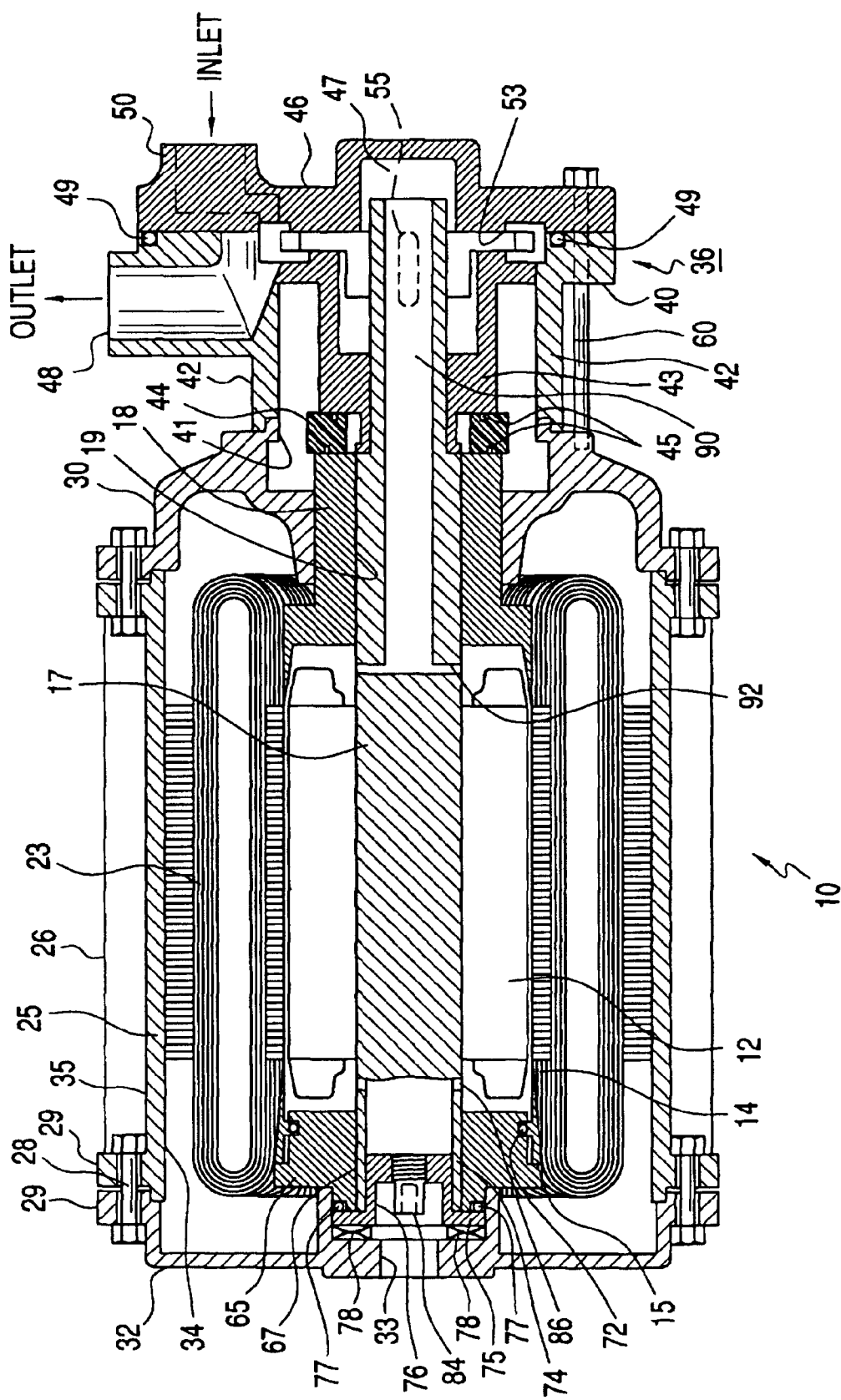
FIG. 2 is a cross-sectional view of the arrangement of FIG. 1 incorporating one impeller.
Figure 3:
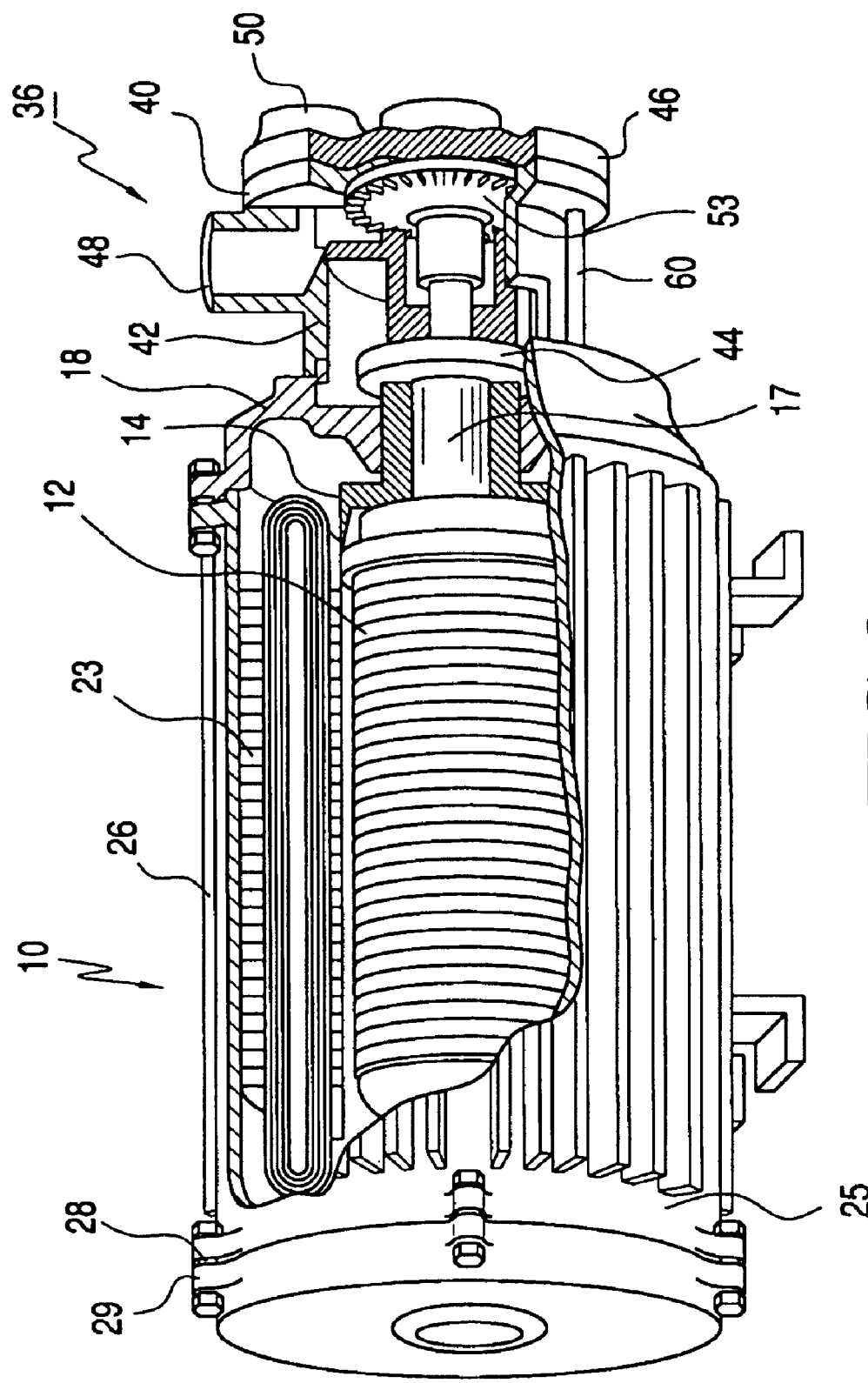
FIG. 3 is a perspective view, partially broken away, of parts of the interior of the combination of FIGS. 1 and 2.
Figure 6:
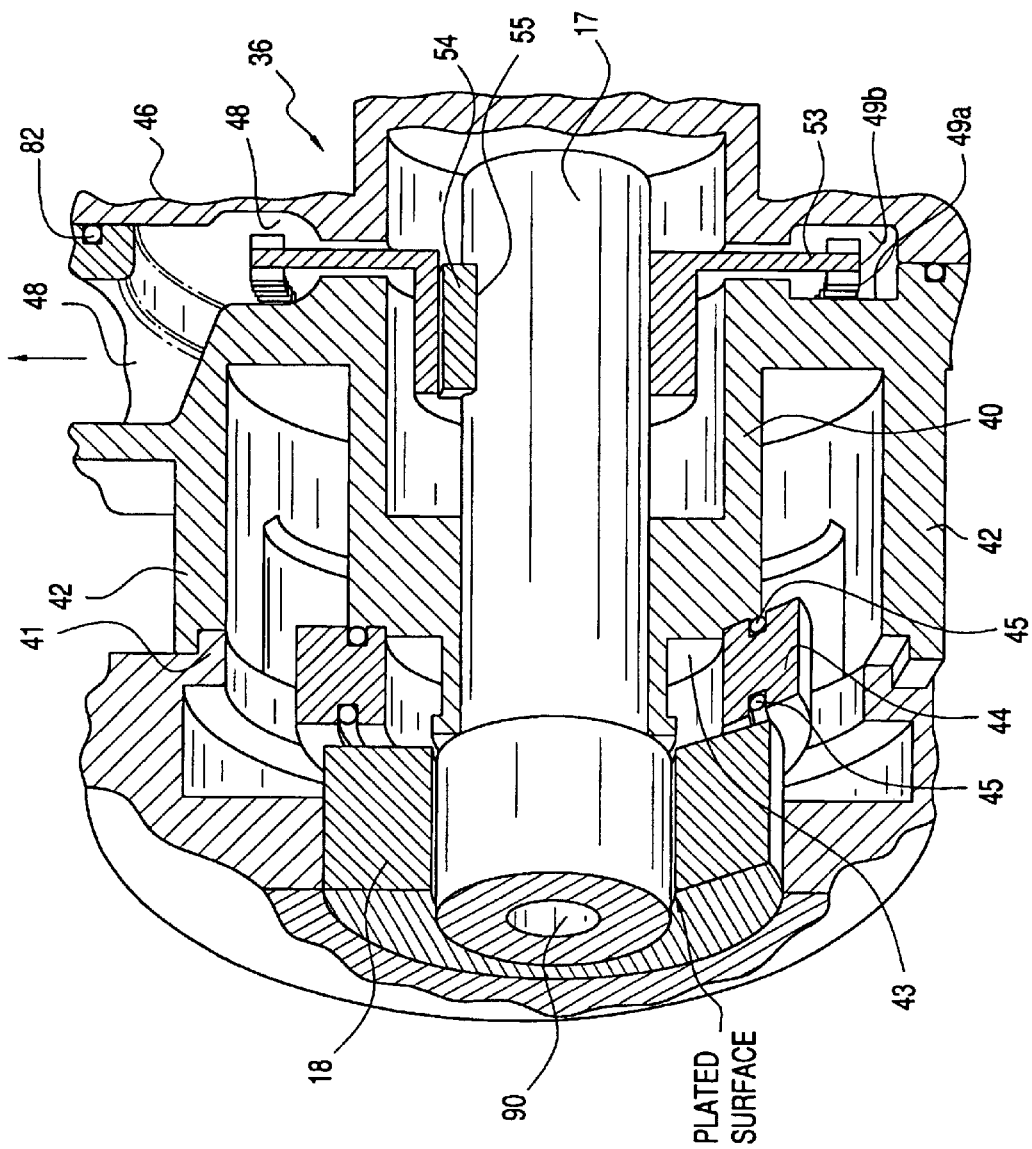
FIG. 6 is a fragmentary perspective view, partially broken away, of the interior of the pump end of the unit, showing further details thereof.
Figure 9:
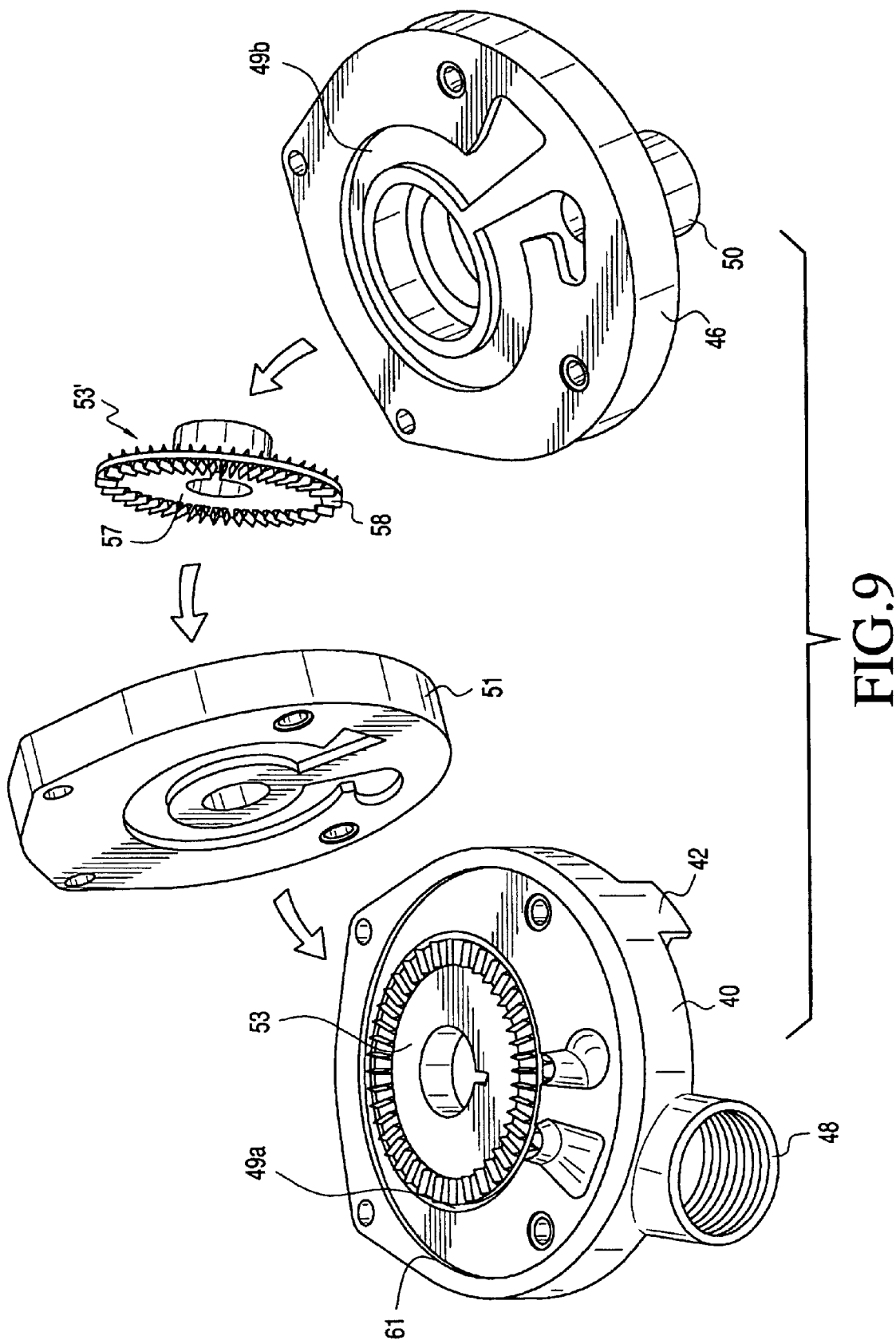
FIG. 9 is a exploded perspective view of part of the modification of FIG. 8, depicting a housing body, end cap and an alternative interposable member for optionally increasing its interior chamber volume to permit the additional impeller to be used.

The pump 36 is of the regenerative turbine type and comprises a pump housing fabricated as separate mating modules, with two engageable principal parts in this example. The two module construction is shown in FIGS. 1, 2, 3, and 6, while FIGS. 8 and 9 depict the three module variant. In both examples the pump housing has, closest to the motor, a pump body 40 with circumferentially spaced support legs 42. These legs 42 engage, in separate quadrants, mating side surfaces 41 extending about the circumferential periphery of the first end cap 30 of the motor housing 25 at this radius. As best seen in FIGS. 1, 2, and 6, the support legs 42 have small radial and circumferential dimensions at their ends which contact the motor housing, and thus provide only small cross-sectional contact areas for thermal energy conduction in the central axis direction to or from the facing surfaces 41. The pump body 40 is of cast metal, but not highly conductive. An inner ring 44 of thermally nonconductive material, such as a synthetic resin, is here disposed between the end hub 18 of the rotor shell 14 and the facing inner radial end 43 of the pump body 40, as best seen in FIGS. 2 and 6. The thermal isolator or spacer ring 44 is sealed by O-rings 45 against each of the adjoining members. In one practical example of a 1500 watt motor, the isolator ring 44 is less than one half inch long, adequate to substantially attenuate thermal conduction along the central axis in the region close to the shaft 17 when the thermal transfer fluid at the pump varies from –40° C. to +120° C. Where the anticipated range of temperature variations in the fluid is less, direct contact can be employed without exceeding acceptable bearing temperature variations.

The housing of the pump 36 also includes a pump end plate 46 configured to mate with the pump body 40 portion so as to close off the end of the pump 36, in both modular versions. The internal faces of the pump body 40 and end plate 46 have largely complementary concavities which, when the pump body 40 and pump end cap 46 are engaged in facing relation, define a shaped interior chamber 47 (FIG. 2) of generally circular form on both axial sides of the blades of an impeller. The chamber 47 extends to an outlet 48 formed in the pump body 40 which extends tangentially from the periphery of the interior chamber 47, where an inset ring or annular groove 49 envelops the blades of an impeller mounted on the shaft 17. The ring groove 49 portion of the chamber 47 is also in communication via a short channel with an inlet 50, in the end plate 46, that is parallel to the central axis and transverse to the plane of the ring groove 49. The ring groove volume about the impeller blades is defined by opposing grooves 49a and 49b (as is seen in FIG. 9) disposed in the pump body 40 and pump end plate 46 respectively. An impeller 53 is coupled to the shaft 17 by a key 54 seated in a groove 55 in the shaft 17 and a corresponding axial groove in the inner bore of the impeller 53. Rotary pumps with one impeller and having a body and end plate in this construction are known and further description of these elements would be superfluous for the single impeller version.

At the second or fill end of the shaft 17, the open end of the cylindrical shell 14 is closed at the edge 15 by a transverse end or closure member 65 that has an interior bore closely spaced from the shaft 17 exterior. The body of the closure member 65 forms a cylindrical journal surface 67 plated with a noble metal, again typically silver, to provide hydrodynamic bearing support for a bearing surface 68 on the shaft 17. This portion of the system is best seen in FIGS. 2, 4, 5 and 7. The outer periphery of the end member 65 engages the circular edge 15 of the cylindrical shell 14, the end section of which diverges slightly in this region, and is engaged against it axially by a separate end shoulder 70 and peripherally sealed by a circumferential O-ring 72. The outer portion of the end member 65 protrudes to the fill end of the shaft 17 which includes a hollow and inset end section 74 used in the filling operation. A concave end cup 76 is received within the end of the hollow section 74 of the shaft 17, and includes a radial flange 75 that extends outwardly from the central bore of the cup 76. An O-ring 77 seals the joinder between the axial end of the end member 65 and the radial flange 75. The exterior (i.e. fill end side) surface of the flange 75 is engaged on its flat side by a compression spring 78 concentric with and about the end bore 33 and by the housing end cap 32 on the other. A modern compression spring, such as a Belleville spring 78, can exert a selected force (such as an 800 pound force in this instance) when fully engaged. An externally threaded fill valve 84 is seated in mating threads in the base portion of the interior of the end cup 76, in communication will the inset opening in the hollow end section 74 of the shaft 17. The interior of the hollow end section 74 opens to the interior of the rotor 12 enclosure via radial apertures 86, which are on the rotor side of the bearing 68. The fill valve 84 is conveniently the type known as a Schroeder valve, which opens to pressure inflow of the heat transfer fluid (in this instance) after its central valve stem has been depressed by an actuator pin in the liquid fill line (not shown).

Figure 7:
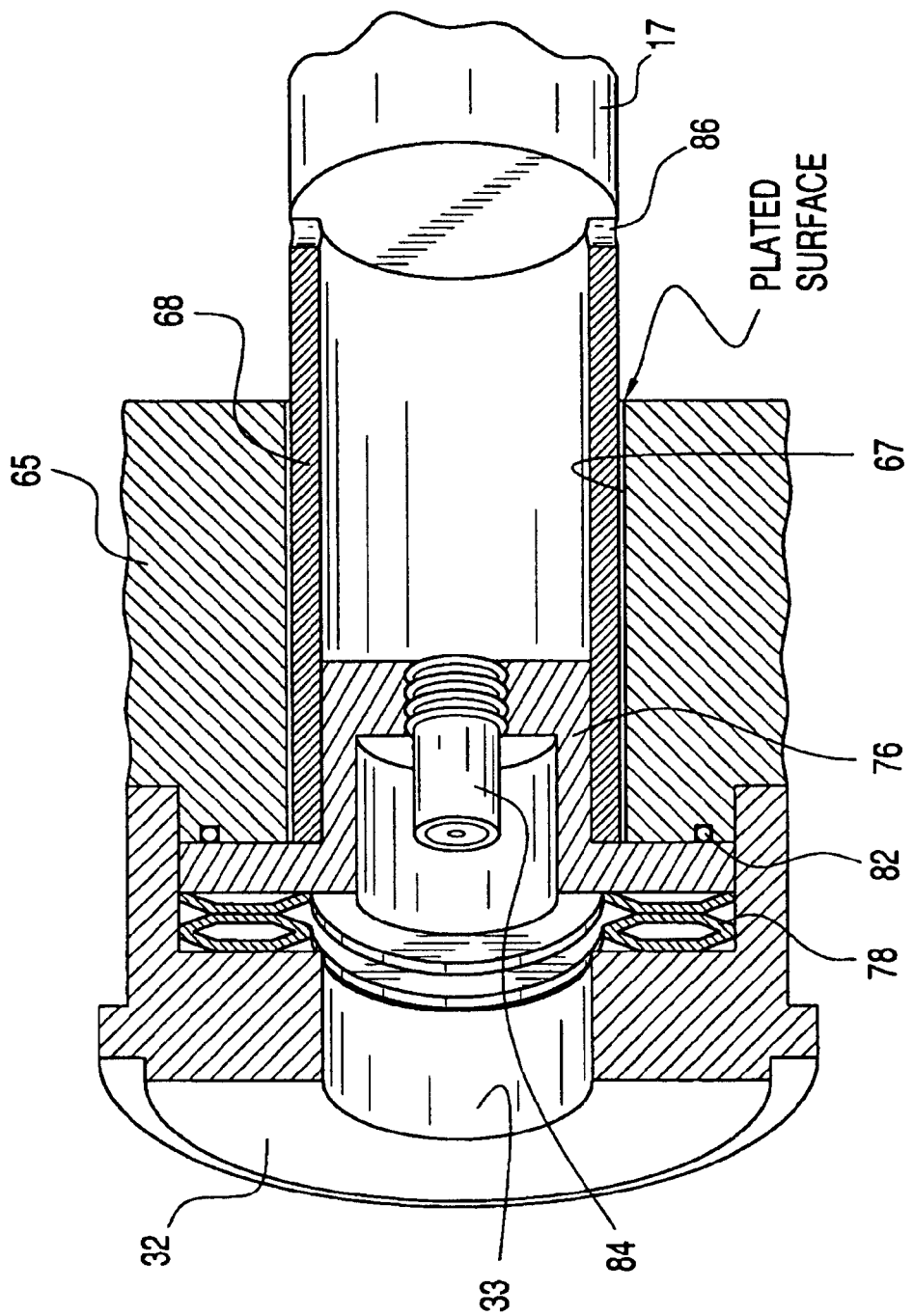
FIG. 7 is an enlarged perspective view, partially broken away, of a portion of the rotor enclosure employing a compression spring, hydrodynamic bearing, and fill valve at the fill end of the unit.

At the first end of the shaft 17, as seen in FIGS. 2, 5 and 7 an axial conduit 90 extends from the interior chamber 47 of the pump housing 38 into the interior of the rotor 14 enclosure, via at least one radial conduit 92 in the shaft 17 wall. This radial conduit 92 is also on the inner or rotor side of the bearing 19 region so that upon shaft 17 rotation there is sufficient flow into both sides for hydrodynamic operation. After the pump pressure on the heat transfer fluid has initially infiltrated the volume inside the rotor enclosure, there is thereafter no meaningful transfer of thermal energy from or to the rotor enclosure via the thermal transfer fluid. The radial size of the axial conduit 90 in the shaft 17 is substantial, so that the shaft 17 wall is thin, which reduces the heat conduction along the shaft 17 to the bearing region and the principal body of the shaft 17. The size of the conduit 90 can be reduced by using, a nonconductive insert, such as a synthetic resin tube with a central passageway, without increasing heat conduction in the axial direction.

Accordingly, the system has a number of advantages, in addition to the requisite characteristics of low thermal conduction and thermal isolation between the closely coupled pump and rotor enclosures. The fill valve gives access to the rotor enclosure, so that on startup the interior can be filled and the hydrodynamic bearings immediately lubricated. Even though the elements at the fill end are physically separate and interchangeable, they are effectively sealed, by virtue of the force exerted by the motor housing on the rotor enclosure parts via the compression spring. With the selected force provided by the Belleville spring, and sealing provided by the O-rings, the desired leak free connections are established even though assembly and disassembly are feasible. Consequently, the substantial advantages of interchangeability of parts that are afforded by this design act to reduce material costs, assembly costs, and production costs. Tolerance variations are taken up between the various elements, which are held together in sealed relation by the compressive forces that are exerted. Disassembly involves only disengagement of the end cap of the motor housing from the remainder of the body.

The basic unit, moreover, is compact and less costly because the plated journal surfaces are integral parts of the rotor enclosure, reducing size requirements while easing assembly problems. Generally available, mass produced parts, such as the motor housing and pump housing are used without substantial modification.

In accordance with the present invention, moreover, the pump end may alternatively include, as seen in FIGS. 7 and 8, an optional spacer insert 51 of uniform width (except for interior concavities), which is configured to be interposed between the pump body 40 and the end plate 46. The spacer insert 51 is configured with openings and passageways opposing the peripheral grooves 49a, 49b in the body 40 and end plate 46 to provide two annular interior passageway volumes, each receiving a different impeller 53 or 53'. The spaced apart impellers 53, 53' are mounted on the shaft 17, being seated in axially separated keyways 55, 56 on the shaft 17 and thus positioned within the interior chamber 47 of the pump 36. These impellers 53, 53' are of the type having a flat disk body 57 and peripherally spaced blades 58 mounted perpendicularly, to provide desired pressure and flow for given conditions of impeller velocity and size, and fluid viscosity. Small keys 54, 54' (FIG. 9) fit into the keyways 55 or 56 and into longitudinal slots in the associated impeller to lock the impeller against turning relative to the shaft 17. The impellers 53, 53' find a stable axial position between the adjacent sidewalls in the pump housing when at operating speed. With this arrangement, the same two basic modules 42, 46 for the pump 36 can either be used with a single impeller, or, if a substantially higher flow rate is desired, the second impeller 53' can be installed, with no other modification than insertion of the spacer insert 51. Bolts 60 extending through holes in the pump modules along lines parallel to the central axis, are engageble in the motor housing 25, to secure the modules together, and the pump 36 as a whole to the motor housing 25. The interior chambers are peripherally sealed by O-rings 61, one in the body 40 and the other (not visible) in one face of the insert 51, while shaped depressions or apertures in the modules 40, 46 and 51 provide inlet-outlet flow paths no matter which alternative is used.

Use of the optional spacer insert in the pump body allows ready modification of the pump rate by easy disassembly of the end cap from the pump body, insertion of the spacer insert and a second impeller, and reassembly of the modules. The inlets, outlets and passageways are adequately sized for the increased flow. Only a short interval for refill of lost thermal transfer fluid is required.

Figure 10:
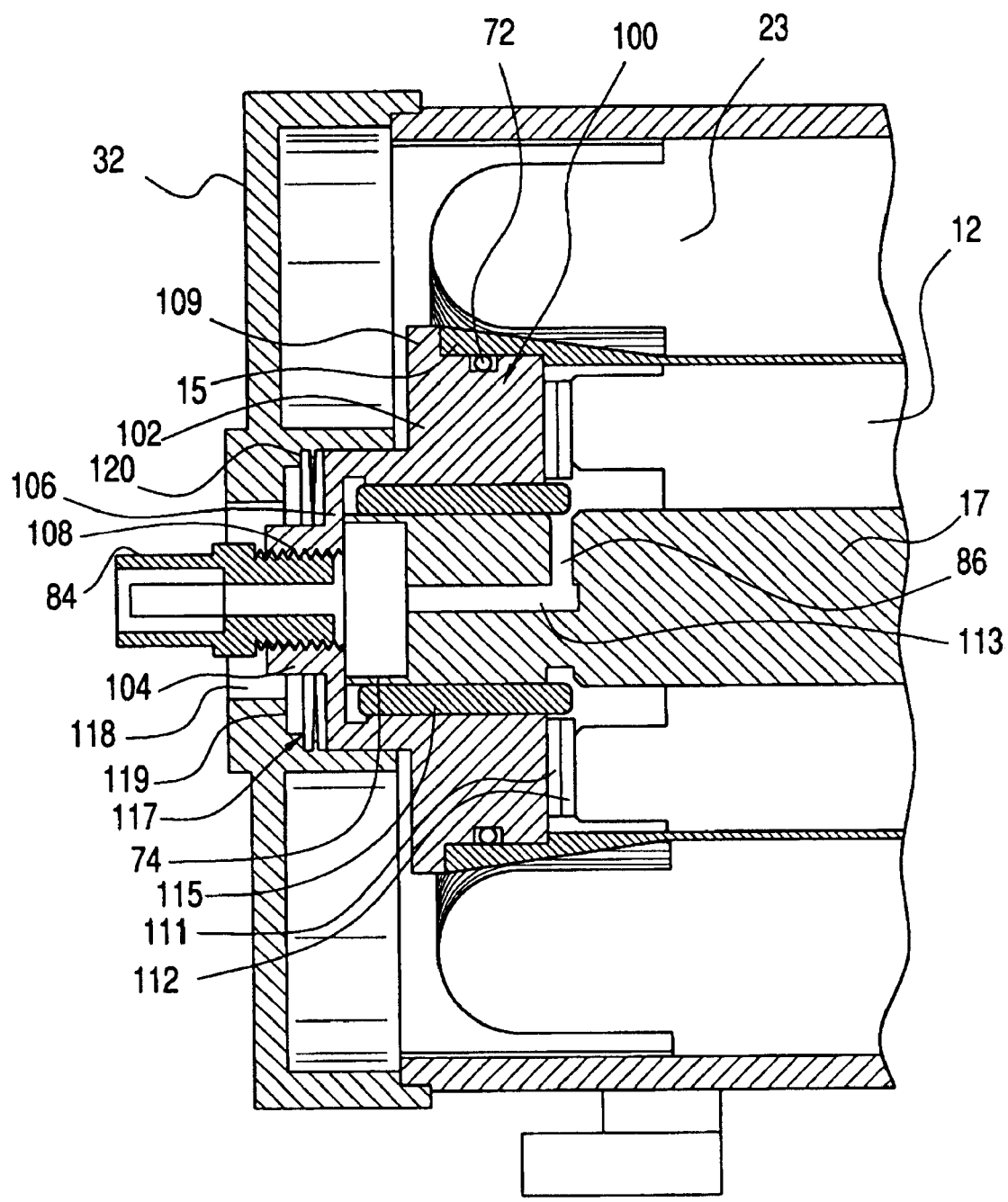
FIG. 10 is a side sectional fragmentary view of an alternative arrangement of the fill end of an assembly in accordance with the invention.

An alternative configuration of the components of the assembly at the fill end of the housing 25 is shown in FIG. 10. In this figure, elements that are identical or similar to elements in the prior views are correspondingly numbered, while only those which differ are given new numbers. Here at the fill end the transverse end member 65 and cup 76 are combined into a single closure member 100 formed as a step down tubular sleeve having a larger diameter section 102 and a smaller diameter section 104 adjoined by a radial transverse flange 106. The smaller section 104 includes an inner female threaded surface 108 for receiving the fill valve 84. The end edge portion 15 of the rotor shell 14 is axially engaged against a shoulder 109 on the enclosure 100 and circumferentially mates with the larger diameter section 102, with sealing being assured by the O-ring 72. A pair of low friction washers 111, 112 are disposed between the rotor side of the closure member 100 and the end of the rotor winding to provide a reactive surface against axial thrust that is found to exist in some circumstances. These washers 111, 112 are of "Rulon" plastic and are employed primarily only as a safeguard against the occasionally encountered thrust forces. The conduit path from the fill valve 84 into the inner side of the hydrodynamic bearing extends into the interior volume within the shaft wall 74 at the fill end of the shaft 17 then a central bore 113, along the shaft 17, and the one or more radial outlets 86 that open to the bearing.

In this instance, the shaft 17 design is seen to have an outer diameter opposing but spaced apart from the closure member 100, with the gap being filled by a hollow sleeve 115, the inner circumference of which functions as a plated journal in the hydrodynamic bearing structure. A two element Belleville spring 117 fitted against the radial flange 106 has two diverging spring segments 118, 119, with the inner segment 118 fitting against the face of the radial flange 106 and the outer part of the outer segment 119 being axially engaged by a shoulder 120 in the housing end cap 32.

The example of FIG. 10 therefore provides sealing using a single closure member 100 and makes the fill valve 42 more accessible to the fluid supply connection that is to be attached. It will generally be preferred to employ an enclosure having a inner bore sized to provide a close fitting, sliding reference for the fill end of the shaft 17, thus establishing a hydrodynamic bearing.

Figure 11:
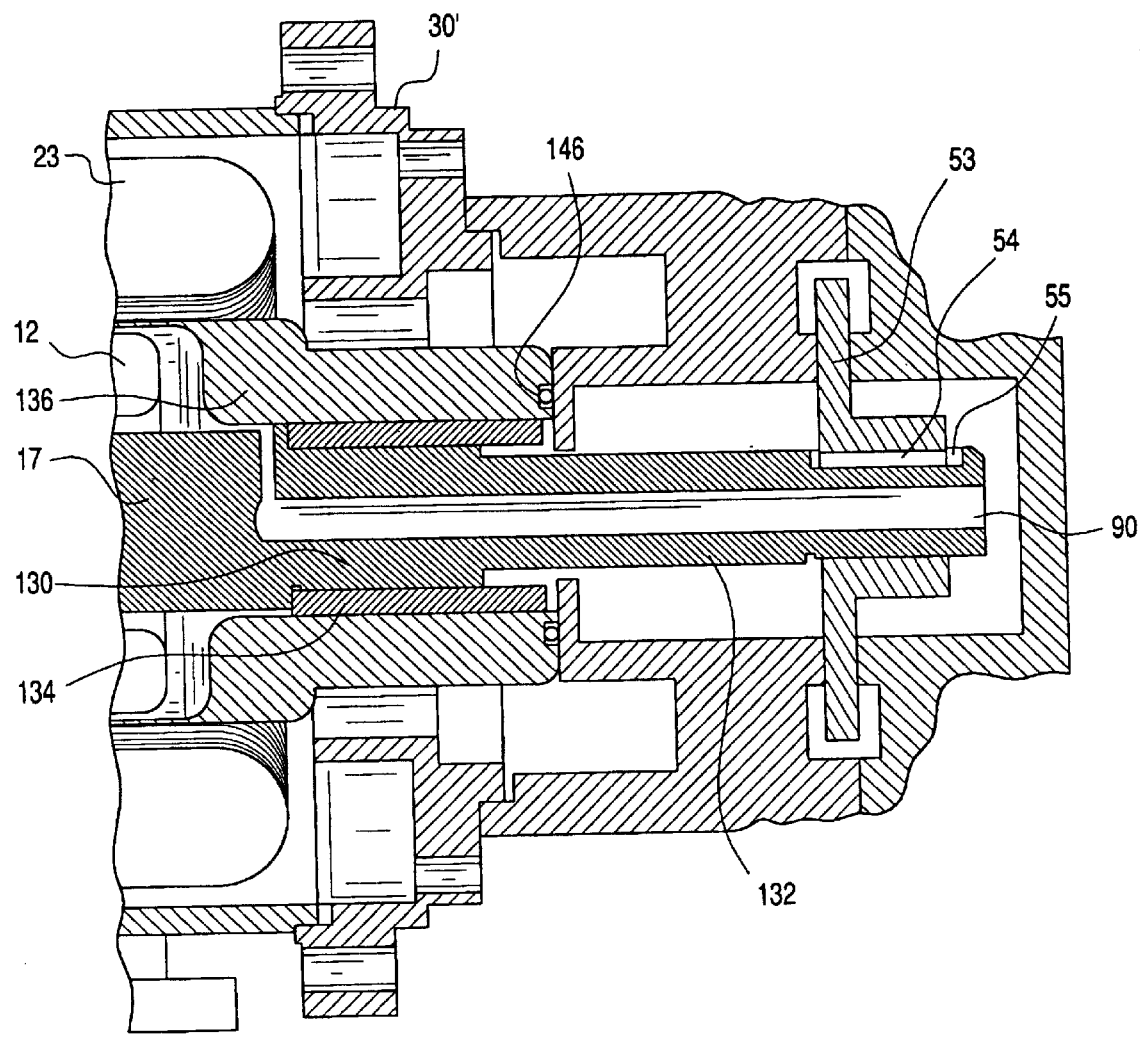
FIG. 11 is a side sectional fragmentary view of an alternative arrangement of the pump end of an assembly in accordance with the invention.

A modification of the pump and of the assembly is shown in FIG. 11, again using a single impeller 53. This Figure shows a stepped-down portion 130 on the pump side of the shaft 17 leading to an end portion 132 that is again of lesser diameter. Here again, a sleeve insert 134 is disposed between the exterior of the first stepped-down portion 130 of the shaft and the facing end sleeve 136 of the rotor shell 14. The rotor shell 14 in this example is a single unit with the thin shell wall 138 along its principal length being integral with end sleeve 136 which encompasses the bearing sleeve 134. The end sleeve 136 and an interior radial flange 144 of the pump housing, however, are in direct axial abutment and not separated by an interposed low thermal conductivity spacer. The abutting transverse surfaces encompass an O-ring 146, but have only a small surface area of contact, and the opposing members are of relatively low thermal conductivity metal. The first end cap 30', it should be noted, has a different shape than the corresponding element of FIGS. 1–3 but is the same in functional aspects.

In this arrangement, a typical motor, such as a 1000 watt motor, tends to operate at a temperature of about 40° C. above ambient, whereas the temperature of the fluid used in thermal transfer can typically vary from −40° C. to +120° C. Under these conditions, the contact surfaces between the rotor shell and pump housing, and the motor housing and the pump housing provide a thermal transfer of less than about 80 watts, which increases the bearing temperature less than 10° C. at the hot extreme and decreases the bearing temperature less than about 10° C. at the lowest temperature extreme. Consequently the hydrodynamic bearings are subjected only to minor temperature and viscosity variations and long life exposure is assured. If the temperature extremes are to be stretched appreciably, then a thermal isolator in the interior radial region may be preferred.

While there have been described above and illustrated in the drawings various forms and modifications, the invention is not limited thereto and incorporates all alternatives and variants within the scope of the appended claims.

I claim:

1. A long life motor driven pump system for pressurizing and supplying a thermal transfer liquid that may vary widely in temperature and viscosity, while employing the same liquid internally in the motor for lubrication of bearings, comprising:

a regenerative turbine type pump having a housing, an input and output, the pump including an interior chamber in communication with the input and output;

a motor of the fluid-filled rotor type having a rotor enclosure, a rotor within the enclosure and a motor shaft along a central axis, with first and second shaft ends extending in opposite directions from the rotor, with the first shaft end extending onto the interior chamber of the pump, a stator about the rotor enclosure, the rotor enclosure including end members concentrically disposed about the respective ends of the shaft and providing journal surfaces for supporting hydrodynamic bearing surfaces along the first and second ends of the shaft and the motor further including a motor enclosure about the stator, the structure coupling the pump housing to the motor housing including a low thermal conductivity path therebetween and the end member of the rotor enclosure being disposed about the second end of the shaft including an aperture accessing the interior of the rotor enclosure;

an end cap member coupled to the motor housing about the second end of the shaft;

at least one impeller mounted on the first end of the shaft in the interior chamber of the pump; and valve means mounted in the aperture of the end member at the second end of the shaft for enabling filling the rotor enclosure with thermal transfer liquid.

2. A pump system in accordance with claim 1 above, wherein the end member at the second end of the shaft is separate from the rotor enclosure, and the system further includes a compression spring between the end cap member of the motor housing and the end member for maintaining the engaging surfaces between the end member and motor enclosure under compression when the end cap member is attached to the motor housing.

3. A pump system in accordance with claim 2 above, wherein the end member is a single element having a larger diameter section between the end portion of the rotor shell and the shaft and a smaller diameter section protruding out the bore of the end cap member and mounting the valve means.

4. A pump system as set forth in claim 2 above, wherein the compression spring is a Belleville spring and further including at least one O-ring between the end member and the rotor enclosure.

5. A pump system as set forth in claim 3 above, wherein the journal surfaces for the hydrodynamic bearings include noble metal layers, and wherein the valve means comprises a Shroeder valve mounted in the end member.

6. A pump system as set forth in claim 2 above, wherein the end member of the rotor enclosure comprises two separate elements, including a hub between the rotor shell end and the shaft and a cup shaped retainer at the end of the shaft for receiving the valve member.

7. A pump system as set forth in claim 1 above wherein the first shaft end includes spaced apart mounts for more than one impeller, the pump housing includes a body portion on the rotor side and an end plate member and wherein the pump housing further includes an insert member configured for mounting between the body portion and end plate member when the two or more impellers are to be used, the insert member having surface concavities on each side for receiving the impellers.

8. A pump system as set forth in claim 7 above, wherein first end of the shaft includes separate spaced apart keyways within the pump housing and the pump includes regenerative turbine impellers having peripheral blades, with each impeller being coupled onto on a separate keyway.

9. A pump system as set forth in claim 1 above, wherein the first end of the shaft includes an axial bore extending from the pump interior chamber to the rotor enclosure interior, and conduits therefrom to the interior of the rotor enclosure, and wherein the shaft wall about the axial bore has a low cross-sectional area for low thermal conductivity.

10. An electric motor/regenerative turbine pump combination comprising:

a motor system having an enclosed rotor and an exterior stator, and a pump end, the motor system including a rotor shell between the rotor and stator that is open at one end, and a shaft extending axially in both directions away from the rotor;

an outer housing about the stator;

an end cap detachably coupled to the outer housing at the side opposite the pump end and including a central bore aligned with the central shaft;

an inner end member spanning and engaging the open end of the rotor shell on the rotor side of the end cap, the inner end member having a central bore about the shaft, the end member being separate from the rotor shell;

an end closure member disposed within the bore of the end member and separate therefrom;

a spring disposed about the central bore the inner end member between the end cap and the inner end member to exert an axial bias on the end member against the rotor shell to maintain a sealed relation therebetween; and a pump having a housing coupled to the pump end of the outer housing and sealingly engaged to the rotor shell, the interior of the pump being in communication with the interior of the rotor shell.

11. A combination as set forth in claim 10 above, wherein the rotor shell further includes a sleeve integral with the rotor shell about the pump end of the shaft, the shaft including at least one passageway communicating between the interior rotor volume and the pump interior volume, and a low thermal conductivity contact structure between the pump housing and the motor housing adjacent the shaft.

12. A combination as set forth in claim 11 above, wherein the spring exerts a force of at least about 800 lbs., and wherein the combination further includes a fill valve disposed in the end closure member at the second end of the shaft, and O-ring means disposed between the end closure and the member end cap and between the end closure member and rotor shell.

13. A combination as set forth in claim 9 above, including also a thermal isolation member disposed between facing surfaces of the pump housing and motor housing.

14. A motor drive and pump combination for pumping a heat transfer fluid that is subject to temperature variations that also cause substantial variations in viscosity, the combination having long life and high reliability despite employing the heat transfer fluid as a lubricant within the motor, comprising:

a drive rotor disposed about a longitudinal axis and having drive shaft extensions along the axis from each end thereof, a first shaft extension having a mount region for at least one pump impeller, the first shaft extension including interior passageways from the end thereof to at lease one outlet opening adjacent the rotor, and a second shaft extension on the side of the rotor opposite the pump;

a rotor housing about the rotor and having an end sleeve with a central bore about the first shaft extension, and a thin cylindrical end wall encompassing the rotor connecting the end sleeve and defining a rotor interior volume with an end edge on the side opposite the pump;

a low heat conductivity thermal energy separation ring engaging the end sleeve of the rotor housing on the pump side;

an impeller-type pump disposed at the mount region of the first shaft extension and having at least one impeller coupled to and about the mount region of the shaft, the pump having a pump housing defining an interior chamber about the at least one impeller communicating with the rotor interior volume, the pump having also including an inlet and outlet for heat transfer fluid;

an end wall structure engaging the end edge of the rotor housing to further define the rotor interior volume, the end wall structure including a bore about the shaft;

hydrodynamic bearing support surfaces coupled to the rotor housing between the bore of the end wall structure and the shaft and the end sleeve bore about the shaft; and a motor structure including a stator and housing disposed about the exterior of the rotor housing.

15. A motor drive and pump combination as set forth in claim 14 above, wherein the first shaft extension comprises two axially separated pump mount regions and the turbine pump includes two impellers, each coupled to a different one of the coupling regions.

16. A motor drive and pump combination as set forth in claim 14 above, wherein the pump housing comprises a first section with an inlet, a second section with an outlet and an optional spacer section intermediate the first and second sections to optionally lengthen the housing for receiving two impellers.

17. A motor drive and pump housing combination as set forth in claim 14 above, wherein the pump housing includes spaced apart legs engaging the pump housing to the motor housing in different circumferential quadrants and providing a minimal area heat conductive path therebetween.

18. A motor drive and pump housing combination as set forth in claim 14 above, wherein the rotor housing further comprises an end closure member seated at the second end of the shaft, an annular spring between the motor housing and the enclosure member, and a fill valve within the end closure member and in communication with the central shaft bore.

19. A closed rotor system for a motor pump combination, comprising:

a rotor disposed about a central axis;

a shaft extending from the rotor in both directions along the central axis;

a regenerative turbine pump disposed about a first end of the rotor shaft extending from the rotor, the pump including a housing with an interior chamber, impeller means in the interior chamber and coupled to the first end of the shaft, an input port leading into the interior chamber, and an output port leading from the interior chamber outside the pump housing;

a rotor shell disposed about the rotor and including an open end wall about the second end of the shaft, a sleeve about the first end of the shaft, and a thin nonmagnetic rotor wall intercoupling the end wall and the sleeve;

a stator disposed about the rotor shell;

an outer housing about the stator;

a housing end cap disposed about the second end of the shaft and securably closing the outer housing at the second end, the end cap spaced apart from the end wall of the shell, the end cap having an interior bore about the central axis;

an end member about the second end of the shaft on the rotor side of the housing end cap, engaging the end wall of the shell, and including an opening receiving the shaft and a surface transverse to the axis of the shaft and opposing the end cap;

a fill valve mounted in the opening in the end member for providing fluid into the interior of the rotor shell; and a spring concentric with the central axis disposed between the housing end cap and the end member to exert axial bias on the end member against the open end wall of the shell in the direction toward the pump when the end cap is secured to the outer housing whereby sealing is maintained despite tolerance variations.

20. A combination as set forth in claim 19 above, wherein the fill valve comprises a Schroder valve inset within the end member, and in communication with the interior of the rotor shell, and wherein the second end of the shaft includes conduits establishing communication between the fill valve and the shaft exterior adjacent the rotor.

21. A combination as set forth in claim 20 above, wherein the pump housing and motor housing comprise a sealed inner chamber encompassing the rotor and the fluid being pumped is in communication with the rotor interior, and wherein the sleeve and the end member are disposed with interior faces adjacent the shaft thereof and include plated surfaces on the interior faces thereof for providing support for hydrodynamic bearings lubricated by the fluid within the inner chamber.

22. A combination as set forth in claim 21 above, further including O-ring means between the end member, and the rotor shell wall and the concentric spring comprises a Belleville type spring.

23. A combination as set forth in claim 20 above, wherein the shaft includes interior apertures communicating between the pump interior chamber and the inner side of the adjacent hydrodynamic bearing.

24. The combination as set forth in claim 23 above, wherein the pump housing is spaced from the pump end of the sleeve, and the combination includes a narrow wall ring of low thermal conductivity material between the opposing faces of the sleeve and the pump housing, and where the combination further includes O-rings between the opposing faces maintaining them in sealed relation.

25. A combination as set forth in claim 24 above, wherein the ring is of plastic and of less than ½ inch long along the shaft axis.

26. A combination as set forth in claim 19 above, wherein the pump housing is configured with a base body, the first end of the shaft includes means extending through the base body for engaging each of two axially spaced apart impellers separately, and the pump housing includes a pump end cap configured to mate with the base body, and the pump housing includes an optional housing insert configured to fit between the base body and the pump end plate, such that either one or two impellers may be mounted on the same shaft to provide different flow capacities.

27. A combination as set forth in claim 26 above, wherein the means for engaging impellers separately on first end of the shaft comprises spaced apart keyways and the impellers have peripheral blades disposed circumferentially thereabout, and wherein the pump housing includes an inlet port in the base body and an outlet port in the pump end cap.

28. A pump for impelling liquid under pressure from a rotating shaft about a shaft axis, comprising:

a pump body having an end face including a concavity therein defining an impeller chamber, open at the end face side, the end face including a planar apron surface about the concavity, and the pump body including a liquid input and output depressions in the body open to the periphery of the concavity at separated regions;

at least one impeller disposed in the impeller chamber concentric with the shaft axis and in a plane perpendicular to the shaft axis;

a pump end body having a substantially planar surface engaging the planar apron surface of the pump body and substantially coextensive therewith, the end body including a groove adjacent to and in communication with the impeller chamber periphery, and liquid input and output depressions in separate communication with the impeller chamber and the input and output depressions in the pump body;

an input port coupled to the pump body and in communication with the input depressions;

an output port coupled to the pump end body and in communication with the output depressions; and a uniform thickness insert between the pump body and the pump end body, the insert including apertures therethrough coextensive with the concavities and the input and output peripheries respectively, whereby the overall pump housing is extendible to accommodate an optional additional impeller.

29. A pump as set forth in claim 28 above, wherein each impeller is of the type having radial blades about its periphery, wherein the input depressions leads at an acute into the periphery of the impeller, and wherein the output depressions lead substantially perpendicularly out form the plane of the impellers.

* * * * *